United States Patent [19]
Peters et al.

[11] Patent Number: 5,978,430
[45] Date of Patent: Nov. 2, 1999

[54] LENGTH GAUGE FOR IN SITU MEASUREMENT OF WATER ROD LENGTHS IN NUCLEAR FUEL BUNDLES AND METHODS OF MEASUREMENT

[75] Inventors: William C. Peters, Wilmington; David G. Smith, Leland; Edward G. Apple, Jr., Wilmington, all of N.C.

[73] Assignee: General Electric Company, Schenectady, N.Y.

[21] Appl. No.: 09/166,935

[22] Filed: Oct. 6, 1998

[51] Int. Cl.$^6$ .................................................. G21C 17/06
[52] U.S. Cl. ............................................................ 376/258
[58] Field of Search .................................. 376/258, 444, 376/446; 33/502

[56] References Cited

U.S. PATENT DOCUMENTS 4,728,483  3/1988  Ahmed et al. ......................... 376/258
5,282,229  1/1994  Ukai et al. .............................. 376/258
5,754,611  5/1998  Petit ........................................ 376/258

*Primary Examiner*—Daniel D. Wasil
*Attorney, Agent, or Firm*—Nixon & Vanderhye

[57] ABSTRACT

The length gauge includes an elongated standards rod, an indicator location block carrying a gauge and an indicator set block. The set block is applied to the location block and the gauge is zeroed out at a known distance between the movable element on the gauge and a reference surface. Water rods are assembled to a tie plate and the gauge is used to measure the length of the adjustable length water rods. The location block receives in a recess a portion of the tie bar of the water rod. The standards rod engages the tie plate and the gauge pin engages the opposite end of the standards rod. Any deviation in the length of the water rod from a designed length is indicated on the gauge.

11 Claims, 4 Drawing Sheets

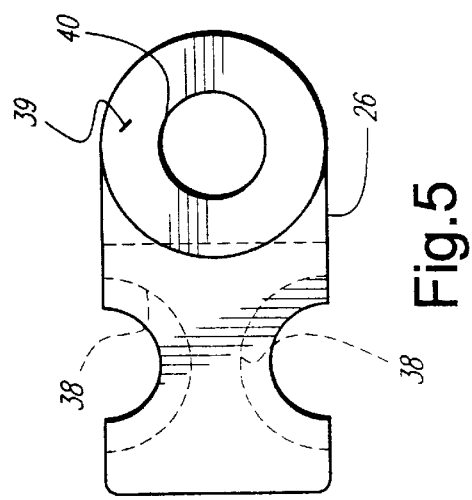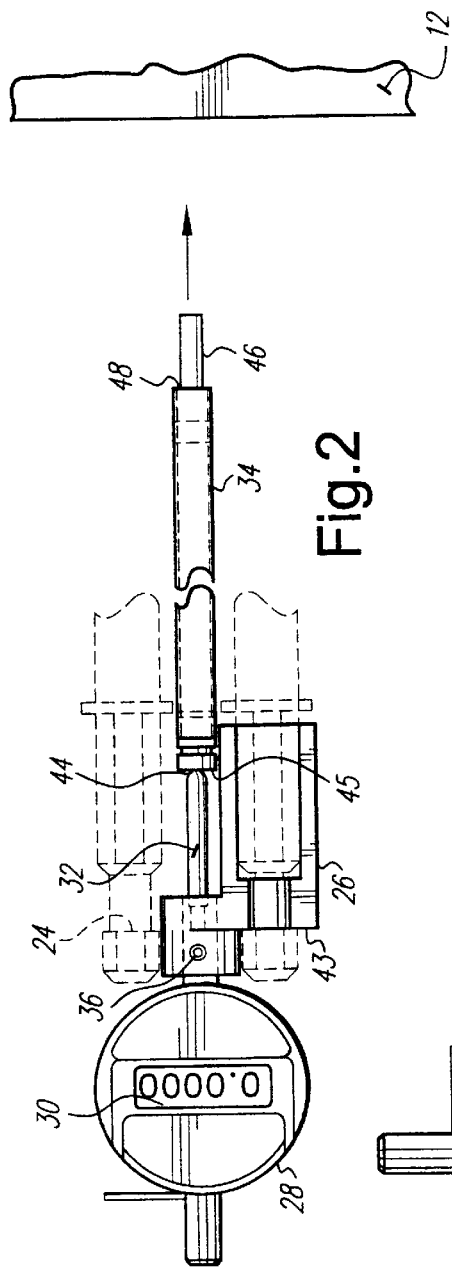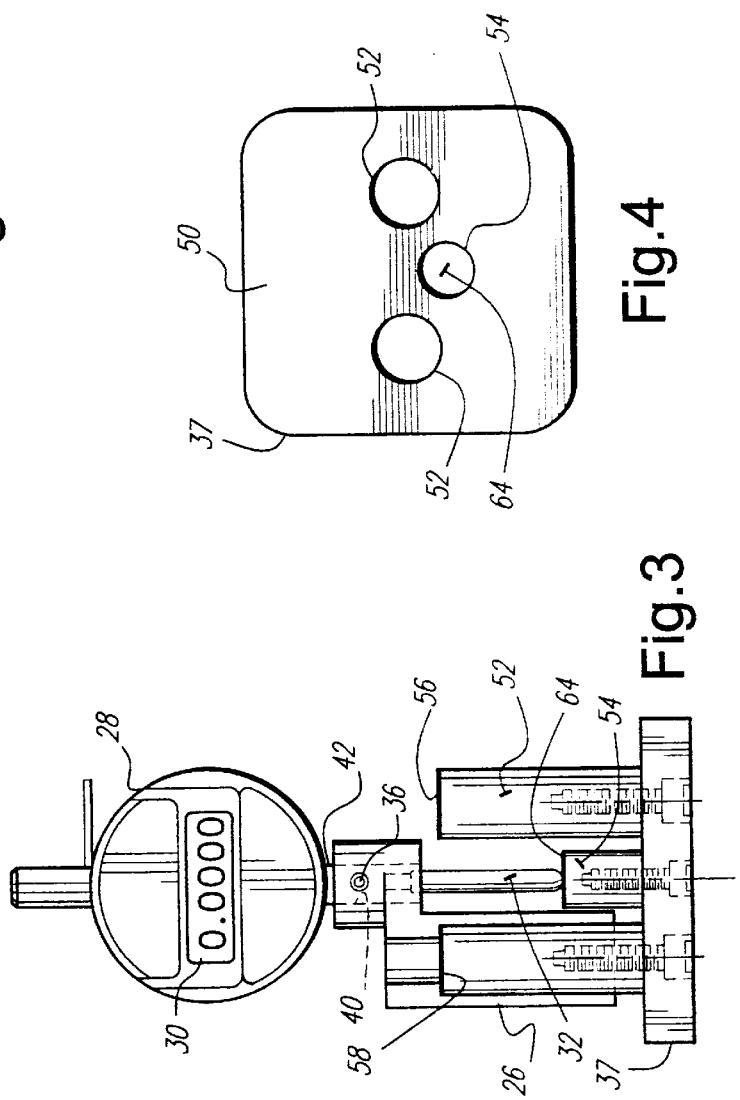

LENGTH GAUGE FOR IN SITU MEASUREMENT OF WATER ROD LENGTHS IN NUCLEAR FUEL BUNDLES AND METHODS OF MEASUREMENT

TECHNICAL FIELD

The present invention relates to the measurement of water rod lengths in a nuclear fuel bundle and particularly relates to apparatus for and methods of measuring the lengths of adjustable length water rods during assembly of the fuel bundle.

BACKGROUND OF THE INVENTION

In a new fuel bundle designed by the assignee of the present invention, mechanical support for the bundle is provided by a pair of central water rods connected to the lower tie plate rather than by conventional tie rods. Each of the water rods comprises a pair of separate assemblies. The lower assembly in each rod comprises a central tube while the upper assembly includes a tie bar. The central tube and the tie bar are adjustably secured to one another by a mechanism not forming part of the present invention but which results in water rods having adjustable lengths. The adjustment is provided by relative axial movement of the central tube and the tie bar which, when adjusted, provide a water rod of fixed length. In this design, and because the fuel bundle is supported at the top by the pair of water rods rather than by tie rods, the overall lengths of the two water rods must be closely matched to prevent tilting or excessive stress on the tie bars. The lengths of each rod from the top face of the lower tie plate to the opposite end of the rod must lie within a very narrow range of tolerances relative to one another, for example on the order of 0.020 inches and must correspond substantially exactly to a predetermined length of the water rod e.g. within 0.040 inches. It will be appreciated that fuel bundles are typically assembled with the bundle lying in a horizontal position which, after assembly, is lifted to a vertical position. That movement as well as other assembly procedures cause stresses in the fuel bundle which can alter the length of the water rods after they have been initially adjusted in length. It is essential that the water rods lie within specific design length limits when the fuel bundle is shipped to the operational site.

BRIEF SUMMARY OF THE INVENTION

According to the present invention, there is provided a length gauge for in situ measurement of water rod lengths during and after final assembly of the nuclear fuel bundle. The length gauge includes an indicator location block, a gauge for mounting on the indicator location block and carrying a movable element, a standards rod and an indicator set block. The indicator location block preferably includes a block body have arcuate recesses opening along opposite sides of the body and carrying a boss for mounting an indicator gauge on the block body with the movable element projecting below a first reference surface on the block. The tip of the movable element constitutes a second reference on the block. The standards rod includes a reduced diameter lower end for insertion in an opening in the lower tie plate. The opposite end comprises a flat surface for engagement with the second reference surface of the element. The indicator set block includes a pair of known length cylindrical projections essentially straddling a reduced length cylindrical projection. The upper surfaces of the long projections constitute first datum surfaces and the upper surface of the smaller projection constitutes a second datum surface.

To use the gauge, the gauge is first set to a predetermined indication, typically a zeroed-out position on the gauge's digital indicator, for a predetermined extension of the movable gauge element. To accomplish this, a long projection on the indicator set block is disposed in one of the recesses of the indicator location block with the first datum surface bearing against a third reference surface on the location block. The movable element of the gauge engages the second datum surface and the gauge is zeroed to the known distance between the first and second datum surfaces.

To assemble the fuel bundle, the pair of water rods are secured to the lower tie plate. Using the length gauge, the length of the water rods are set. For example, one end of the standards rod is inserted into an opening in the lower tie plate. The location block is disposed below a reference seat at the upper end of a tie bar of one of the water rods. By engaging the opposite end of the standards rod against the movable element, the gauge indicates any deviation in the length of the water rod from a designed length corresponding to the length of the standards rod plus a known predetermined distance between the first reference on the location block and the tip of the movable element. By measuring each water rod, the rods may then be adjusted in length to the design length.

After adjustment of the water rod lengths, the gauge and the standards rod are removed and the spacers are secured to the water rods at selected axial positions. Subsequently, the standards rod is inserted through the spacers. To accomplish this, a shaped end e.g. a bullet nose is disposed on one end of the standards rod to facilitate insertion of the standards rod through the openings in the spacers. Once the standards rod with the shaped end emerges into the region between the lowermost spacer and the lower tie plate, the shaped end is removed from the end of the standards rod and the standards rod is inserted into the opening in the lower tie plate. The fuel rods are then assembled into the spacers with the standards rod in place. Once the bundle has been finally assembled and displaced to an upright position, a second measurement using the length gauge is effected. This is accomplished in the same manner as previously described to ensure that the lengths of the water rods lie within design limits. The standards rods can then be finally removed by withdrawing it axially from the fuel bundle.

It will be appreciated that the standards rod when inserted into the spacers occupies a lattice position corresponding to a part length fuel rod. Thus the final fuel rod, i.e., the PLR, may then be inserted into the fuel bundle through aligned openings in the spacers and secured to the lower tie plate to complete the assembly.

In a preferred embodiment according to the present invention, there is provided in a nuclear fuel bundle having a water rod connected to a lower tie plate, apparatus for measuring the length of the water rod comprising a standards rod engageable at one end with the lower tie plate, an indicator location block, the block defining a first reference surface for bearing against a seat on the water rod, a gauge having a movable measuring element mounted on the block with the movable element engageable with an opposite end of the standards rod, the element defining a second reference surface a predetermined distance from the first reference surface at a predetermined gauge indication, whereby the gauge indicates any deviation of the length of the water rod from a designed length corresponding to the length of the standards rod and the predetermined distance.

In a further preferred embodiment according to the present invention, there is provided a method of measuring the length of a water rod in situ in a nuclear fuel bundle, the water rod being connected to a lower tie plate of the bundle comprising the steps of disposing a standards rod in generally parallel side-by-side relation with the water rod, engaging one end of the standards rod against the lower tie plate, aligning a first reference surface on a location block and a reference mark on the water rod, providing a gauge on the block carrying a movable measuring element defining a second reference surface a predetermined distance from the first reference surface at a predetermined gauge indication and engaging the element with the standards rod at an opposite end of the water rod, whereby the gauge indicates any deviation of the length of the water rod from a designed length corresponding to the length of the standards rod and the predetermined distance.

Accordingly, it is a primary object of the present invention to provide novel apparatus and methods for measuring the lengths of water rods in situ in a nuclear fuel bundle.

BRIEF DESCRIPTION OF THE DRAWINGS

FIG. 2 is a schematic representation of the application of a measuring gauge according to the present invention to the water rod in the partially assembled fuel bundle;

FIG. 3 is an elevational view illustrating application of the indicator location block and gauge to the indicator set block;

FIG. 4 is a top plan view of the indicator set block illustrated in FIG. 3;

FIG. 5 is a top plan view of the indicator location block illustrated in FIGS. 2 and 3.

DETAILED DESCRIPTION OF THE INVENTION

Figure 1:
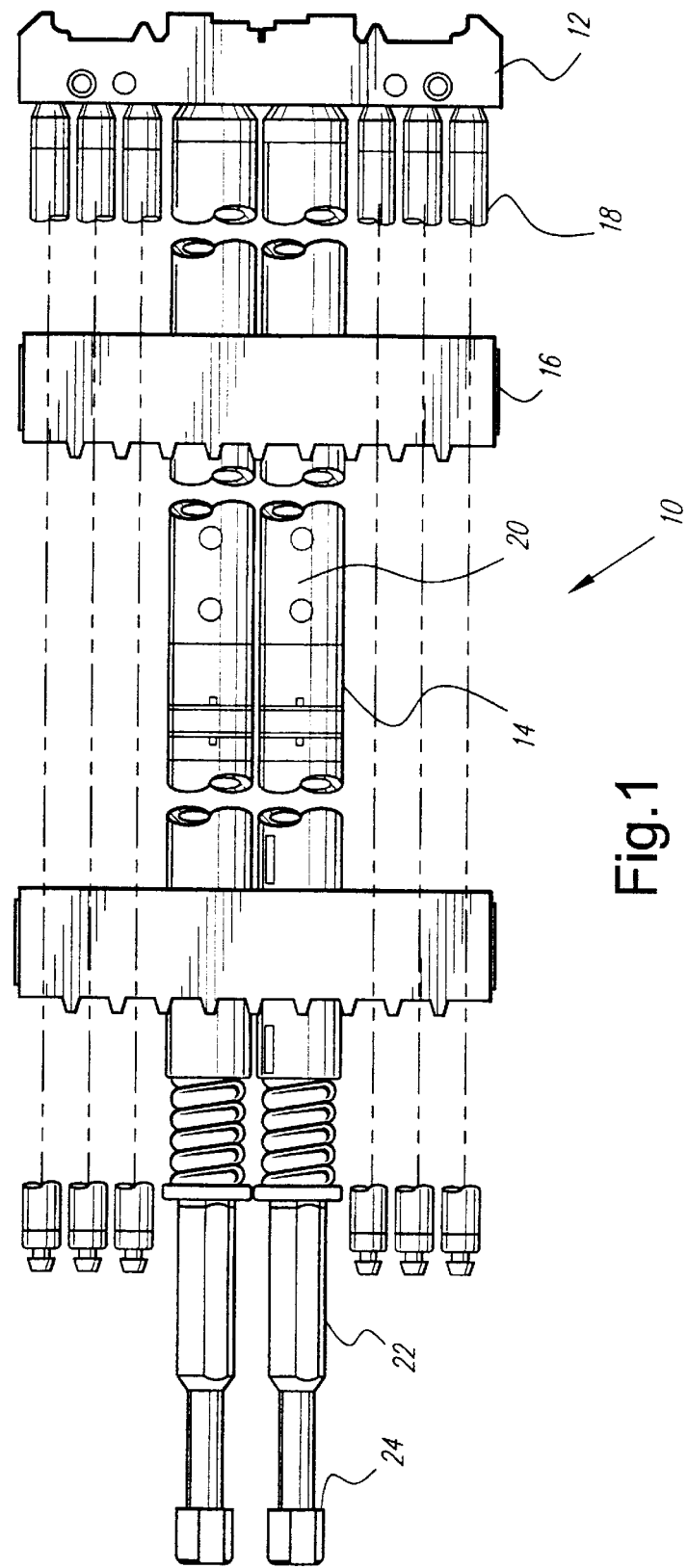
FIG. 1 is a side elevational view of an assembled fuel bundle lying in a horizontal position with parts broken out for clarity.

Referring now to the drawings particularly to FIG. 1, there is illustrated a schematic representation of a nuclear fuel bundle generally designated 10 comprised of a lower tie plate 12, a pair of water rods 14 secured at their lower ends to the tie plate 12, spacers 16 secured to the water rods 14 at spaced positions therealong and fuel rods 18 received through openings in the spacers 16 and secured to the lower tie plate 12. The water rods 14 are each comprised of essentially two sections, a lower central tube 20 and a tie bar assembly 22. The central tube 20 and tie bar assembly 22 of each water rod are secured to one another in a length adjustable manner by a structure which does not form part of the present invention. Suffice it to say that the lengths of the water rods 14 are adjustable in the axial direction within a limited range. As indicated previously, it is important in the present invention to ensure that the lengths of the water rods 14 from the upper surface of the lower tie plate 12 to the underside of seats 24 at the upper ends of the tie rod assemblies 22 are within designed lengths.

Referring to FIGS. 2–5, the length gauge of the present invention includes an indicator location block 26, a digital indicator gauge 28, a standards rod 34 and an indicator set block 37. The digital indicator gauge 28 has a digital readout 30 and a movable extension pin 32. Location block 26 includes a pair of generally semi-cylindrical openings or recesses 38 open to opposite sides of body 26. The upper end of body 26 has a boss 39 with a central aperture 40 for receiving a boss 42 on gauge 28. The gauge 28 and extension pin 32 may be suitably secured to the boss 39 at location 36. Block 26 has a first reference surface 43 for engaging in use the seat 24 (in FIG. 1) of a tie rod assembly. The tip of the movable extension pin 32 constitutes a second reference surface 44.

The standards rod 34 comprises an elongated gauge lab length certified cylindrical rod. The certified length of rod 34 from the face of the lower tie plate 12 on FIG. 2 to the top, i.e., flat surface 45, of the standards rod is an accurate specified length which when combined with the length between the first and second reference surfaces 43 and 44, respectively, on the indicator location block and gauge, with the gauge zeroed out after calibration, is the same as the specified length of the water rod from the face of the lower tie plate 12 to the seat 24. The standards rod 34 has a reduced diameter portion 46 at its lower end for reception in an opening not shown in the upper surface of the lower tie plate 12, such that the shoulder 48 abuts the tie plate surface. The opposite end of the standards rod 34 includes a hardened bearing surface 45 for receiving the tip 44 of the movable extension pin 32 of the gauge.

Referring to FIGS. 3 and 4, the indicator set block 37 comprises a flat plate 50 having a pair of cylindrical projections 52 substantially straddling a reduced length cylindrical projection 54. The upper surfaces of the projection 52 and 54 constitute first and second datum surfaces, 56 and 64 respectively, of known distance between such surfaces used to provide the gauge with a predetermined indication; for example, as a zero position. To calibrate the gauge, one of the projections 52 is disposed in a recess 38 of the indicator location block 26 with its datum surface 56 bearing against a third reference surface 58 formed by a shoulder in part defining the recess 38. With the first datum surface 56 on the indicator set block 37 engaged against the third reference surface 58 on the indicator location block 26, and the second reference surface comprising the tip 44 of movable extension pin 32 bearing against the second datum surface 64 on the indicator set block, the gauge 28 can be zeroed out, i.e., manually adjusted to provide a zero reading.

Prior to assembling the fuel bundle, the water rods 14 in FIG. 1 are secured to the tie plate 12 in a known manner, the assembly being positioned in a horizontal orientation. The length gauge is then employed to measure the lengths of the water rods so that adjustments of the axial length of the water rods can be made to meet the design lengths. To accomplish this, the reduced end 46 of the standards rod 34 in FIG. 2 is inserted into an opening of the tie plate 12 until shoulder 48 abuts the top surface of the tie plate. The indicator location block 26 is applied below the seat 24, i.e., a datum surface of one of the water rods, such that the arcuate recess 38 receives the reduced diameter upper end of the tie bar assembly 22 as illustrated in FIGS. 1 and 2. In that configuration the second reference surface, i.e., the tip 44 of the movable extension pin 32, bears against the hardened upper surface 45 of the standards rod 34. With the first reference surface 43 bearing against the seat 24 and the second reference surface 44 of movable extension pin 32 bearing against the upper end 45 of the standards rod 34, the gauge 28 will indicate any deviation of the length of the water rod from a designed length corresponding to the length of the standards rod plus the predetermined distance between the second reference surface 44 and the seat 24. Should a deviation be indicated by the digital readout 30 outside of required tolerances, the water rods must be adjusted in axial length to more precisely conform to the design length.

Figure 6:
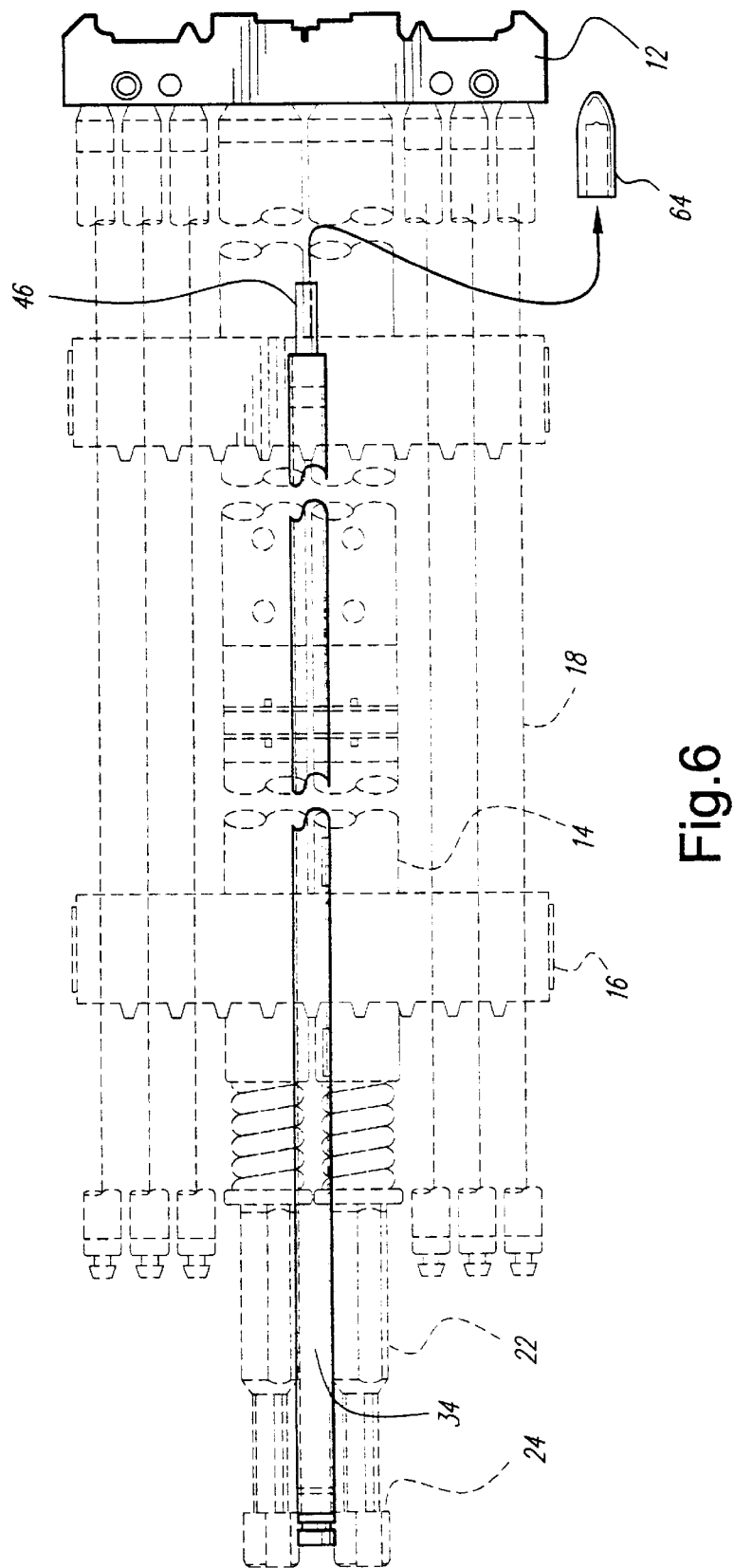
FIGS. 6 and 7 are schematic illustrations showing a sequence of assembly of the standards rod in the fuel bundle.
Figure 7:
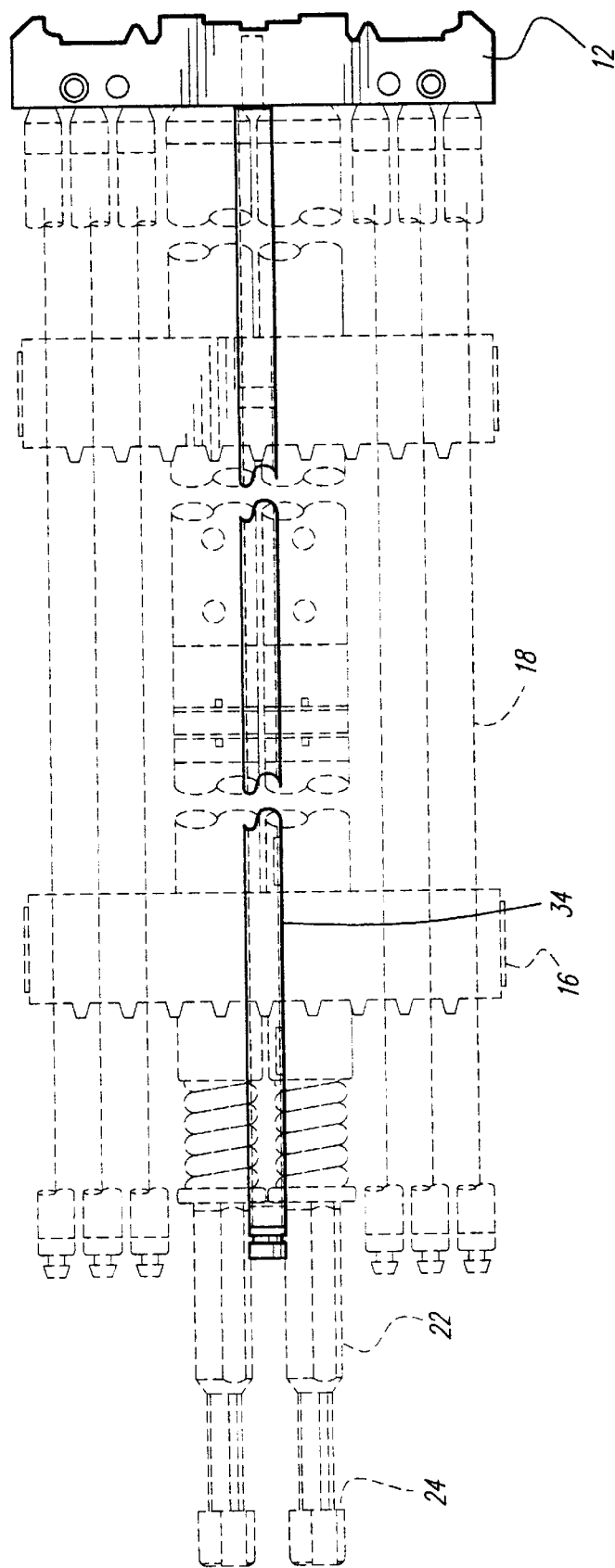

Once the water rods have been adjusted in length, the gauge assembly (26 and 28) and the standards rod 34 are removed from the partial assembly. Next, the bundle 10 is assembled starting with the installation of the spacers 16 to the water rods 14. It will be appreciated that the spacers 16 are secured to the water rods 14 at axially spaced locations along the length of the fuel bundle 10 with each spacer having openings as conventional for receiving the water rods and the fuel rods 18. After securement of the spacers to the water rods, the standards rod is installed in the fuel bundle. To accomplish this, and referring to FIG. 6, a shaped end, for example a bullet nose 64, is installed on the reduced diameter end 46 of the standards rod 34. The standards rod is then inserted from the top of the fuel bundle through openings in the spacers toward the lower tie plate 12. The shaped end 64 facilitates insertion of the standards rod through the openings of the spacers. When the end of the standards rod extends in the region between the lowermost spacer and the lower tie plate 12, the shaped end 64 is removed and the reduced end portion 46 is inserted into the opening of the tie plate similarly as before, as illustrated in FIG. 7. With the standards rod in place, the fuel rods 18 are then inserted through the openings in the spacers and secured to the lower tie plate 12. If desired, an additional verification of the lengths of the water rods can be made at this time, as described in the previous paragraph. Lastly, a suitable lifting tool, not shown, is installed on the bundle to move the bundle from the horizontal assembly position to a vertical inspection stand, not shown. With the fuel bundle in a vertical orientation, and with the lifting tool removed, the gauge and indicator location block are applied to each water rod and measurements are taken similarly as previously described. Thus, any deviation of the length of the water rod from its designed length will be indicated by the gauge 28. Once the measurements are made and the water rods are verified to lie within the designed length, the gauge is removed and the standards rod is withdrawn axially from the tie plate and spacers. It will be appreciated that the standards rod is inserted in one of the openings of each spacer which is otherwise occupied by a fuel rod. Once the standards rod has been removed, a full length or part length fuel rod is inserted in the position previously occupied by the standards rod.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a nuclear fuel bundle having a water rod connected to a lower tie plate, apparatus for measuring the length of the water rod comprising a standards rod engageable at one end with the lower tie plate;

an indicator location block;

said block defining a first reference surface for bearing against a seat on said water rod;

a gauge having a movable measuring element mounted on said block with said movable element engageable with an opposite end of said standards rod, said element defining a second reference surface a predetermined distance from said first reference surface at a predetermined gauge indication;

whereby, said gauge indicates any deviation of the length of the water rod from a designed length corresponding to the length of the standards rod and said predetermined distance.

2. Apparatus according to claim 1, including a second water rod connected to the lower tie plate, said block having a pair of machined arcuate recesses on and opening outwardly thereof for receiving end portions of the water rods respectively.

3. An apparatus according to claim 2, including a boss on said block for mounting said gauge.

4. Apparatus according to claim 1, including a gauge set block having first and second datum surfaces for calibrating said gauge when said location block is applied to said set block.

5. A method of measuring the length of a water rod in situ in a nuclear fuel bundle, the water rod being connected to a lower tie plate of the bundle comprising the steps of:

disposing a standards rod in generally parallel side-by-side relation with the water rod;

engaging one end of the standards rod against the lower tie plate;

aligning a first reference surface on a location block and a reference surface on said water rod;

providing a gauge on said block carrying a movable measuring element defining a second reference surface a predetermined distance from said first reference surface at a predetermined gauge indication; and engaging said element with said standards rod at an opposite end of said standards rod whereby said gauge indicates any deviation of the length of the water rod from a designed length corresponding to the length of the standards rod and said predetermined distance.

6. A method according to claim 5, including applying a gauge set block having first and second datum surfaces to said location block and element of said gauge to calibrate said gauge.

7. A method according to claim 6, wherein said gauge has a digital indicator and including zeroing out the digital indicator when said first datum surface engages a third reference surface on said location block and said element engages said second datum surface.

8. A method according to claim 5, including removing said standards rod, said gauge and said location block from said bundle and, subsequent thereto, applying spacers to said water rod at spaced locations therealong, inserting said standards rod through said spacers, and re-engaging said one end of said standards rod with said lower type plate.

9. A method according to claim 8, including, prior to inserting the standards rod through said spacers, applying a shaped end to the one end of the standards rod to facilitate passage of the standards rod through the spacers and removing the shaped end from the one end of the standards rod prior to re-engaging said one end thereof with said lower tie plate.

10. A method according to claim 8, including inserting fuel rods through said spacers with said standards rod in said fuel bundle and determining any deviation in length of the water rod from the designed length thereof subsequent to insertion of said fuel rods.

11. A method according to claim 10, including after the step of determining, removing the standards rod by withdrawing the standards rod through the spacers in a direction away from said lower tie plate and inserting at least a partial length fuel rod in the fuel bundle in place of the standards rod.

* * * * *